(12) United States Patent
Fellows (10) Patent No.: US 11,678,429 B2
(45) Date of Patent: Jun. 13, 2023

(54) INERTIAL ELECTROSTATIC CONFINEMENT FUSION DEVICE

(71) Applicant: Ryan Paul Fellows, Hollister, CA (US)

(72) Inventor: Ryan Paul Fellows, Hollister, CA (US)

( * ) Notice: Subject to any disclaimer, the term of this patent is extended or adjusted under 35 U.S.C. 154(b) by 614 days.

(21) Appl. No.: 16/668,706

(22) Filed: Oct. 30, 2019

(65) Prior Publication Data

US 2021/0136906 A1    May 6, 2021

(51) Int. Cl.
*G21B 1/03* (2006.01)
*H05H 3/06* (2006.01)

(52) U.S. Cl.
CPC ............. *H05H 3/06* (2013.01); *G21B 1/03* (2013.01)

(58) Field of Classification Search
CPC ... H05H 3/06; H05H 1/02; G21B 1/03; Y02E 30/10
See application file for complete search history.

(56) References Cited

U.S. PATENT DOCUMENTS

| 4,446,096 A | * | 5/1984 | Auchterlonie | G21B 1/00 376/145 |
| 2005/0118350 A1 | * | 6/2005 | Koulik | H05H 1/44 219/121.36 |
| 2007/0252580 A1 | * | 11/2007 | Dine | H05H 1/0081 324/149 |

* cited by examiner

*Primary Examiner* — Edwin C Gunberg
*Assistant Examiner* — Mamadou Faye (57) ABSTRACT

An inertial electrostatic confinement fusion device has a body defining an internal vacuum chamber cavity, the chamber having attached a pump to evacuate atmosphere to vacuum conditions, the chamber further having attached a source to inject a nuclear fusion fuel at a metered rate, the chamber further having within it a plurality of electrodes connected to a high voltage alternating current power supply such that at least one pair of electrodes consistently have electrical charge of opposite polarity and of equal magnitude, the distance between them defining an electrode gap. The assembly acts to control the specific relationship between the electrode gap and the applied power, both frequency and voltage, to excite ions of the nuclear fuel enough to generate fusion but alternate the electrode polarity sufficiently to prevent the ions from completely traversing the electrode gap, preventing electrode bombardment.

3 Claims, 9 Drawing Sheets

INERTIAL ELECTROSTATIC CONFINEMENT FUSION DEVICE

FIELD OF THE INVENTION

The present invention relates to inertial electrostatic confinement fusion devices and, more particularly, to an inertial electrostatic confinement fusion device featuring a high voltage, high frequency alternating current electrical power source, a vacuum chamber containing internally a plurality of electrodes, and a nuclear fusion fuel source.

BACKGROUND OF THE INVENTION

The concept behind inertial electrostatic confinement fusion was first proposed in 1959 in a research paper co-authored by Elmore, Tuck, and Watson of Los Alamos National Laboratory. The initial concept, was essentially a cage that would capture electrons and utilize their electromagnetic interaction with positively charged ions to accelerate the ions together to the point they would fuse together. Such fusing of nuclear particles releases a surplus of energy due to the difference in mass between the particles when in the bound condition and the free condition. The concept has been proven to work in both in nature, the most apt example being the sun, as well as in lab conditions. In 1962, Philo T Farnsworth filed a patent (U.S. Pat. No. 3,258,402) for a device that would generate a plasma field and then accelerate ions in the plasma toward a focused point within a spherical body at velocities sufficient to cause nuclear fusion. The device was essentially comprised of an inner and outer metallic grid, each electrically charged with opposite polarity such that they would influence the ions inside the chamber to accelerate from the outer grid toward the inner grid to a focused collision point at the center of the inner grid. Shortly thereafter, Robert Hirsch and Farnsworth began work jointly on a design for a device that would demonstrate this capability. The device they came up with is commonly referred to as the "fusor." Hirsch filed a patent (U.S. Pat. No. 3,530,036) for this device in 1967. Both Hirsch and Farnsworth filed subsequent patents for other aspects and improvements of the device. (U.S. Pat. Nos. 3,386,883, 3,530,497, 3,664,920)

While the fusor did demonstrate an ability to fuse nuclei together, it was found to be so inefficient as to never produce more energy than was required to run the device. The primary culprit for the energy deficit was found to be the wasted energy from ions colliding with the inner grid. It was intended that these ions would pass through the abundant openings in the inner grid but, in practice, they collide with the grid surface substantially, which results in both wasted ions as well as a grid that is bombarded with charged particles. This ion bombardment causes the grid to heat up which increases the electrical resistance of the grid, thus requiring more electrical energy be consumed to maintain sufficient grid charge. These collisions are also of a high enough energy that they degrade the grid to a degree that would warrant replacement many times over the life of any such device utilized in an actual power production scheme. Due to the complexity of the vacuum chamber assembly, replacing an inner grid would represent a substantial cost compared to the initial build cost of the device.

There have been a number of attempts to overcome the so-called "grid losses" over the decades since the fusor design was initially created. One of the more successful devices was invented by Robert W. Bussard. It is commonly known as the "polywell." He filed a patent for his design (U.S. Pat. No. 4,826,646) in 1985. Bussard's device eliminated the metallic component from the inner grid and replaced it with a magnetically suspended pool of electrons. This would attract the positively charged ions in much the same way a charged metallic inner grid would. While this design is still under active development at the time of this application, it has thus far been too inefficient to generate net power, much like its predecessor, the fusor. The energy deficit is primarily attributed to plasma energy losses through cusps in the magnetic confinement fields. Such gaps in the fields are inevitable due to the physical geometric constraints of the coils used to generate said fields and the pressures at which the plasma is confined. Similar devices to Bussard's "gridless" polywell have been proposed, with some having been built and tested and with some possessing active patents (U.S. Pat. Nos. 9,082,517, 9,881,698, 4,233, 537) but have all suffered from enough inefficiency generally attributed primarily to cusp leakage that none have successfully generated a net power gain.

There are further types of nuclear fusion devices that should be mentioned for the purpose of completeness, but that differ from inertial electrostatic confinement substantially. These two popular alternate designs have attempted nuclear fusion with varying degrees of success and both utilize magnetic confinement methods rather than electrostatic confinement. They are known as Tokamaks and Stellarators. They are similar to each other in that they both function to direct the plasma to flow like a fluid current in a helical trajectory around a toroidal geometry. A Tokamak utilizes multiple electromagnetic fields to perform three main functions. The first function is to cause the plasma field to circulate around the torus. The second function is to cause the plasma to circulate perpendicular to its toroidal flow such that the net result is a helical path that circles around upon itself. The third function is to control the outbursts of plasma, similar to solar flares on the sun, that are inherent to plasmas confined in such a manor. Stellarators work similar to tokamaks with the exception that their helical pathway is built into the physical geometry of the plasma chamber so as to require fewer magnetic fields to produce the desired helical pattern of flow. Both of these designs show varying degrees of success but still suffer from enough inefficiency to prevent net energy production to date. They both vary substantially in design from traditional inertial electrostatic confinement fusion devices. The primary difference between said designs is that they do not utilize an electrostatic grid to any degree but instead rely on magnetic fields to shape and then confine their plasmas. The other obvious departure is the geometry of their plasmas being contained in a long toroidal shape with a hole in the center. This configuration has much more surface area per volume of plasma than the same volume of plasma concentrated in a body with no hole and requires considerable effort to prevent the plasma from escaping or contacting the wall of the device where ever there is surface area of the plasma. It is the efficiency of the concentrated shape of the plasma and the reduced effort of confining plasma's exterior surface that makes inertial electrostatic confinement fusion devices attractive as a means of nuclear fusion power generation over that of Tokamak or Stellarator style devices, despite their aforementioned grid disadvantages.

Therefore, a need exists for a new and improved inertial electrostatic confinement fusion device that eliminates the problems associated with the metallic grid losses associated with the fusor and the plasma field energy losses associated with the polywell or similarly "gridless" designs. In this regard, the various embodiments of the present invention substantially fulfill at least some of these needs. The inertial electrostatic confinement fusion device according to the present invention substantially departs from the concepts and designs of the prior art, and in doing so provides an apparatus with the means and purpose of providing a nuclear fusion device with the capability of a net energy gain by eliminating losses due to grid bombardment and cusp leakage.

SUMMARY OF THE INVENTION

The present invention provides an improved inertial electrostatic confinement fusion device, and overcomes the above-mentioned disadvantages and drawbacks of the prior art. As such, the general purpose of the present invention, which will be described subsequently in greater detail, is to provide an improved inertial electrostatic confinement fusion device that has all the advantages of the prior art mentioned above.

To attain this, the preferred embodiment of the present invention comprises a vacuum chamber enveloping a plurality of electrodes that are separated by a gap defined by a distance of free space between said electrodes. Said vacuum chamber being electrically insulated from the internally contained electrodes. Within said chamber, being introduced via a port in the wall of the chamber in a metered quantity, an amount of fusion fuel such as, but not limited to, deuterium gas. The electrodes being powered by a high voltage alternating current source capable of alternating the opposing electrodes' polarities at a substantial rate, causing them to act alternatingly as anode and cathode at sufficient frequency and energy so as to accelerate the ionized nuclear particles back and forth between the electrodes at velocities sufficient to facilitate nuclear fusion and to decelerate the particles relative to their inter-electrode component of travel and reverse their direction prior to contact with any electrode or other tangible component of the assembly, thus eliminating the energy losses and component degradation experienced by prior art. There are, of course, additional features of the invention that will be described hereinafter and which will form the subject matter of the claims attached.

There has thus been generally outlined the more important features of the present invention in a manner that introduces the following detailed description and present contribution to the art with sufficient background to allow it to be more easily and completely understood.

DESCRIPTION OF THE CURRENT EMBODIMENT

Shown in the drawings is a current embodiment of the of the inertial electrostatic confinement fusion device of the present invention. It is generally designated by the reference number 10.

Figure 1:
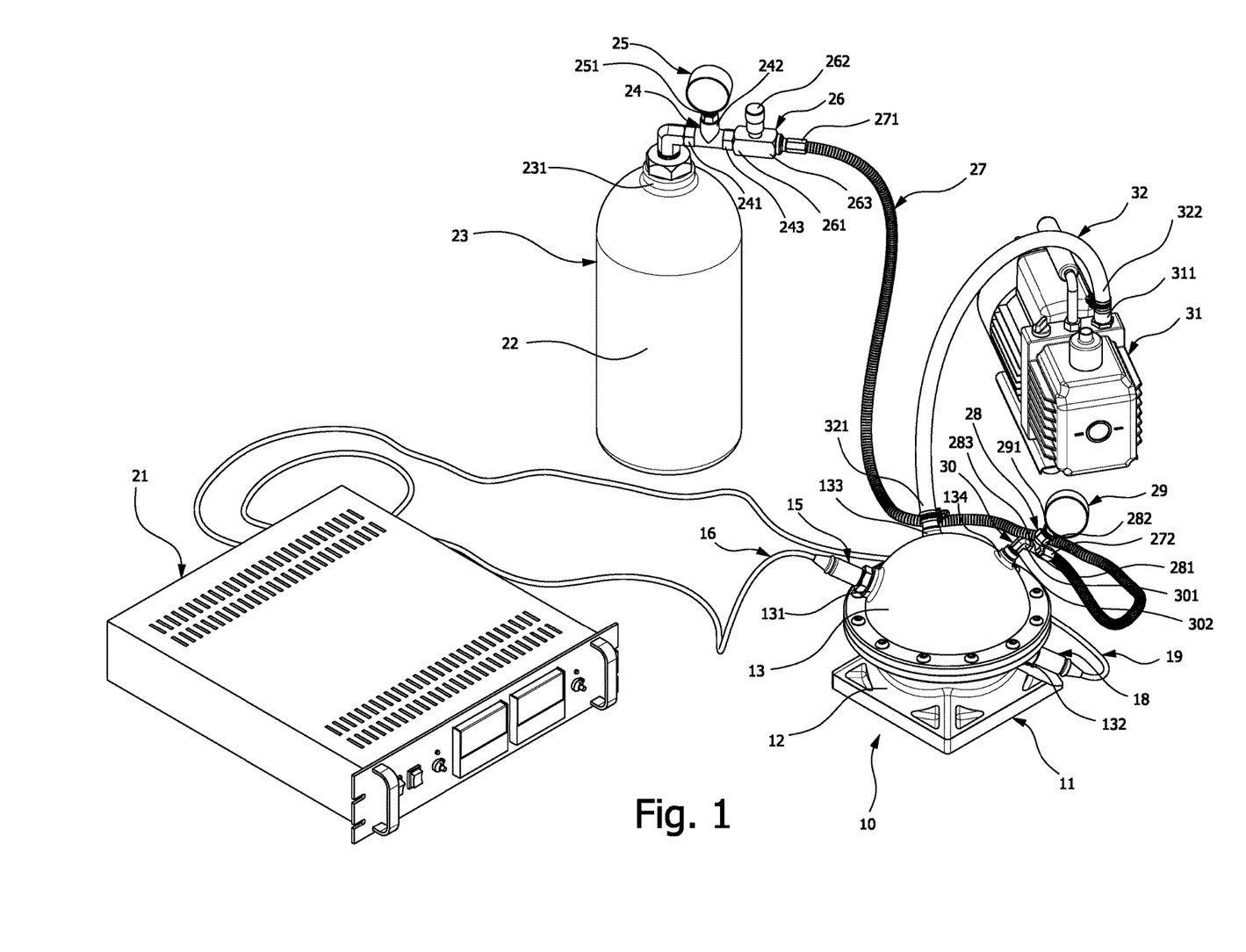
FIG. 1 is a front isometric view of an assembly of the major exterior components that comprise the current embodiment of the inertial electrostatic confinement fusion device.

FIG. 1 illustrates a vacuum chamber assembly 11 and its peripheral components. Vacuum chamber 11 includes a chamber base 12, a chamber top 13, chamber base 12 and chamber top 13 forming a vacuum cavity 14, illustrated in FIG. 2, and a plurality of bungs to accept means of attachment to peripheral components. Said bungs are comprised of a first electrode bung 131, a second electrode bung 132, a vacuum bung 133, and a nuclear fusion fuel bung 134. Affixed to first electrode bung 131 is a first electrical feedthrough 15, attached externally to a first insulated high voltage wire 16 and attached internally to a first electrode or plurality of electrodes 17 of FIGS. 2, 3, 4, 5, 6, 7, 8 and 9. Affixed to second electrode bung 132 is a second electrical feedthrough 18, attached externally to a second insulated high voltage wire 19 and attached internally to a second electrode or plurality of electrodes 20 of FIGS. 2, 3, 4, 5, 6, 7, 8 and 9.

Referring still to FIG. 1, illustrated is a high voltage, alternating current power supply 21 of magnitude sufficient to induce nuclear fusion of a nuclear fusion fuel 22, such as but not limited to deuterium gas. First insulated high voltage wire 16 and second insulated high voltage wire 19 are attached to output terminals of power supply 21. The construction of components and connections between power supply 21 and first electrode or plurality of electrodes 17 and second electrode or plurality of electrodes 20 is sufficient to safely transmit the high voltage current from said power supply to said electrodes and to maintain a practical vacuum within vacuum cavity 14 of vacuum chamber assembly 11. The measure of sufficient magnitude to induce nuclear fusion of nuclear fusion fuel 22 is governed by a probability curve of nuclear particle interactions at given energy inputs. Said probability curve varies by fuel type and has been developed theoretically and empirically and, as a specific example using deuterium gas as the supplied fuel, ions beginning to have a measurable output of fusion energy release in the form of detectable fast neutron emission when electrical input drives said deuterium gas to an energy of 10,000 electron volts or greater. While fusion occurs at increasingly smaller likelihood below 10,000 electron volts, it is a preferred threshold of the scientific community to consider where useful fusion begins to occur in a given example nuclear fusion fuel 22 of deuterium gas. It is thus that power supply 21 is capable of supplying an alternating current of a voltage of 10,000 volts or greater at an amperage of 10 milliamps or greater to first electrode or plurality of electrodes 17 and second electrode or plurality of electrodes 20.

Referring still to FIG. 1, the frequency at which power supply 21 must be able to alternate the polarity of its current must be great enough to alternate the attractive electrostatic force of a given electrode to a repellant electrostatic force before an ion of given nuclear fusion fuel 22 can collide with said electrode when said ion is moving at a speed sufficient to support nuclear fusion and traveling across a distance of least gap between any given opposite polarity electrode contained within vacuum cavity 14. Such frequency is great enough to prevent collision of nuclear fusion fuel 22 ions with any electrodes contained within vacuum cavity 14 of the current embodiment of the present invention. Using again deuterium gas as example nuclear fusion fuel 22, the frequency at which power supply 21 must be able to alternate its electrical current is greater than 19.3 megahertz per one inch of electrode gap at a supply voltage of 10,000 volts. An even greater alternating current frequency is generally desired to add a safety margin in case voltage supply is not perfectly stable and falls under the rated output or the measured gap between electrodes is not perfectly accurate and falls short of that used for calculation of alternating current frequency.

Referring still to FIG. 1, illustrated is pressurized gas tank 23 containing within it nuclear fusion fuel 22 and a single outlet 231. A first tee junction pressurized gas fitting 24 comprises an inlet 241, a first outlet 242, and a second outlet 243. A first pressure gauge 25 comprising an inlet 251 is attached to first outlet 242. First pressure gauge 25 displays a an output reading indicating the relative remaining supply of nuclear fusion fuel 22. A precision flow regulator 26 includes an inlet 261, an adjustable valve 262, and an outlet 263. Inlet 261 is attached to second outlet 243. A pressurized gas supply line 27 includes an inlet 271 and an outlet 272. Inlet 271 is attached to outlet 263. A second tee junction pressurized gas fitting 28 includes an inlet 281, a first outlet 282, and a second outlet 283. Inlet 281 is attached to outlet 272. A second pressure gauge 29 comprises an inlet 291. Second pressure gauge 29 displays an output reading of the pressure within vacuum cavity 14 of vacuum chamber assembly 11. Inlet 291 is connected to first outlet 282. A pressurized gas coupling 30 includes an inlet 301 and an outlet 302. Inlet 301 is connected to second outlet 283. Outlet 302 is connected to nuclear fusion fuel bung 134 of chamber top 13. Adjustable valve 262 controls the flow of nuclear fusion fuel 22 into vacuum cavity 14. The construction of components and connections between pressurized gas tank 23 and chamber top 13 are of sufficient construction to support practical vacuum operation.

Still referring to FIG. 1, illustrated is a vacuum pump 31 including an inlet 311 through which gasses are evacuated to induce vacuum pressure. From empirical data it is known that vacuum pump 31 must be of a sufficient grade to support a vacuum pressure of between 0.001 torr and 0.02 torr to support inertial electrostatic confinement fusion. A vacuum hose 32 is comprised of an inlet 321 and an outlet 322. Inlet 311 is connected to outlet 322. Inlet 321 is connected to vacuum bung 133 of chamber top 13. The construction of the components and connections between vacuum pump 31 and chamber top 13 are of sufficient construction to support practical vacuum operation.

Figure 2:
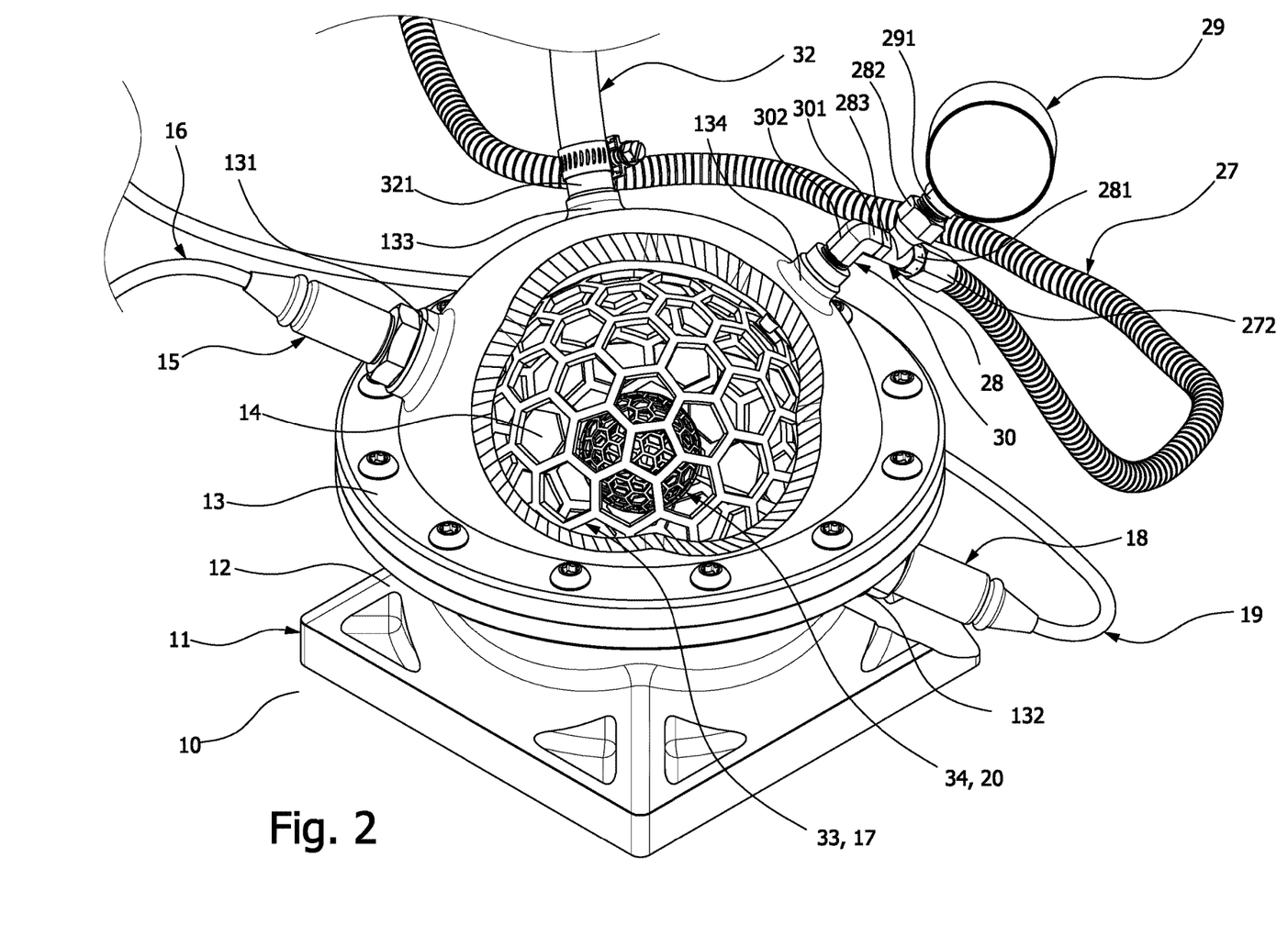
FIG. 2 is a front isometric sectional view of the current embodiment of the vacuum chamber containing an example configuration of electrodes comprised of an inner spherical electrode grip concentrically located within an outer spherical electrode grid constructed in accordance with the principles of the present invention and suitable for use with the inertial electrostatic confinement fusion device of FIG. 1.

FIG. 2 illustrates an isometric view of vacuum chamber assembly 11 with chamber top 13 sectioned to show, internally, first insulated high voltage wire 16 and second insulated high voltage wire 19 connected to first electrical feedthrough 15 and second electrical feedthrough 18, respectively. Illustrated also are pressurized gas supply line 27 and vacuum hose 32 and their supporting componentry. First electrode or plurality of electrodes 17 and second electrode or plurality of electrodes 20 may exist in various geometric embodiments. However, illustrated in FIGS. 2, 3, 4, and 5 is a preferred geometric embodiment of said electrodes consisting of a spherical electrically conductive grid 33 of diameter less than the interior size of the walls forming internal vacuum cavity 14, composing first electrode or plurality of electrodes 17, and a still smaller diameter spherical electrically conductive grid 34 contained broadly concentric within spherical conductive grid 33, composing electrode or plurality of electrodes 20. Such a geometric configuration is a preferred embodiment because nuclear fusion fuel 22 will distribute itself broadly evenly within void contained between spherical conductive grid 33 and spherical conductive grid 34 because the electric field between said grids has a generally uniform intensity compared to electrode shapes that have non-symmetrically distributed edges or focal points.

Figure 3:
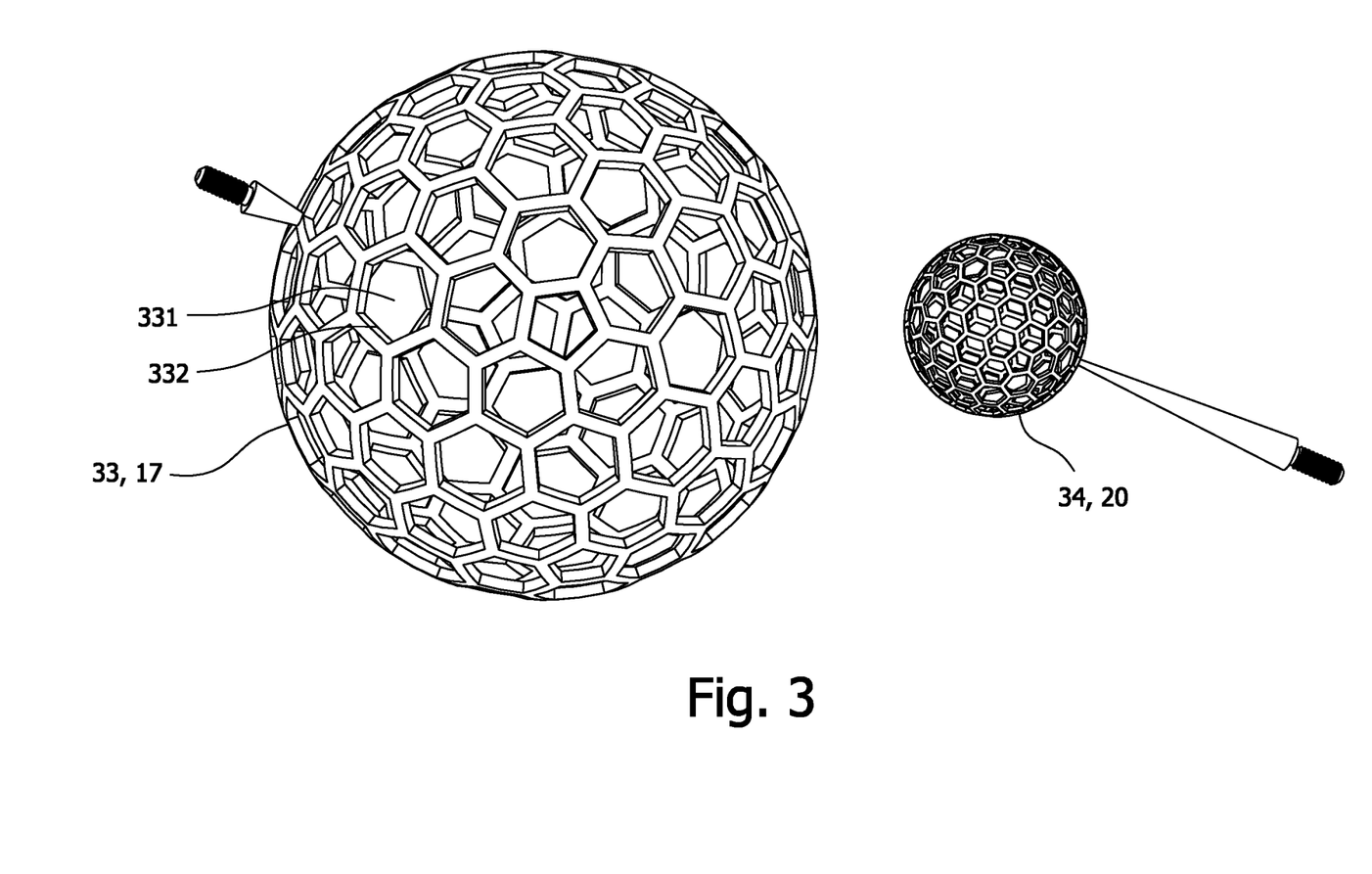
FIG. 3 is a front isometric exploded view of the example configuration of the current embodiment of the electrodes of FIG. 2.

FIG. 3 illustrates an exploded view of spherical conductive grid 33 and spherical conductive grid 34, composing an example of a preferred embodiment of first electrode or plurality of electrodes 17 and second electrode or plurality of electrodes 20, respectively, of FIG. 2. The electrodes are electrically conductive and feature broadly symmetrically orientated and broadly similarly sized voids 331 to facilitate passage of nuclear fusion fuel 22 particles throughout vacuum cavity 14 and to prevent pressure differentials from forming as environmental gasses are evacuated from said cavity during vacuum pressurization. The symmetry of said voids also serves to evenly situate edges 332 of said electrodes so as to mitigate edge effect of the electric field in which the electric field lines bend about the edge of electrode plate by distributing edges broadly symmetrically about the electrode plate surface.

Figure 4:
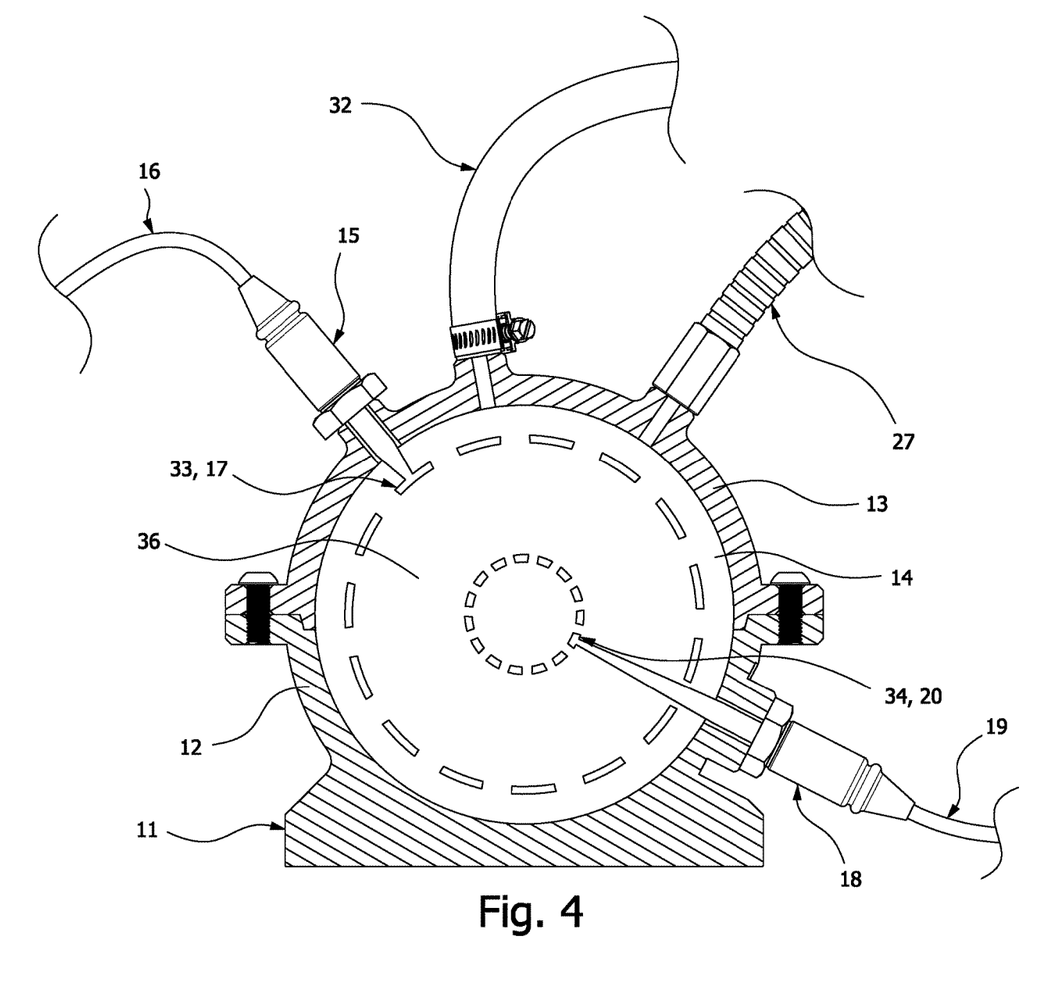
FIG. 4 is a front sectional simplified view of the current embodiment of the chamber and electrodes of FIG. 2 and the vacuum hose and fuel hose of FIG. 1.

FIG. 4 illustrates a sectioned profile of the vacuum chamber assembly 11 of FIG. 2, pressurized gas supply line 27 and vacuum hose 32 of FIG. 1, and spherical conductive grid 33 and spherical conductive grid 34 composing an example of a preferred embodiment of first electrode or plurality of electrodes 17 and second electrode or plurality of electrodes 20, respectively, the drawing simplified to a two-dimensional representation for convenient fitment of included componentry and ease of understanding. To prevent electrical arcing within vacuum chamber 11, to provide an appropriate number of nuclear fusion fuel 22 atoms for the size of vacuum cavity 14, and to prevent atmospheric atoms from parasitically absorbing the energy being introduced in said vacuum cavity, vacuum pump 31 evacuates ambient atmospheric gasses from said vacuum cavity via vacuum hose 32 to sufficient vacuum pressure, typically between 0.001 torr and 0.02 torr. Once at pressure, first electrode or plurality of electrodes 17 and second electrode or plurality of electrodes 20 become electrically energized by power supply 21 such that they are oppositely polarized and therefore a strong electrostatic potential is generated. Because of the lack of atmospheric atoms or other forms of electrically conductive matter in vacuum cavity 14, no current flows between said electrodes. However, because power supply 21 is an alternating current power source, the polarity of the electrodes alternate with the frequency of power supply 21. Said electrodes maintain opposite polarities of complimentary magnitude such that as one electrode transitions from negative to positive, the opposite electrode transitions substantially equally from positive to negative. Electrode gap 36 is defined by the void of free space between said electrodes and the electric field intensity generated between said electrodes is dependent upon the distance of said electrode gap. The minimum electrode gap that exists in the assembly is the variable upon which the minimum frequency of power supply 21 is calculated.

Figure 5:
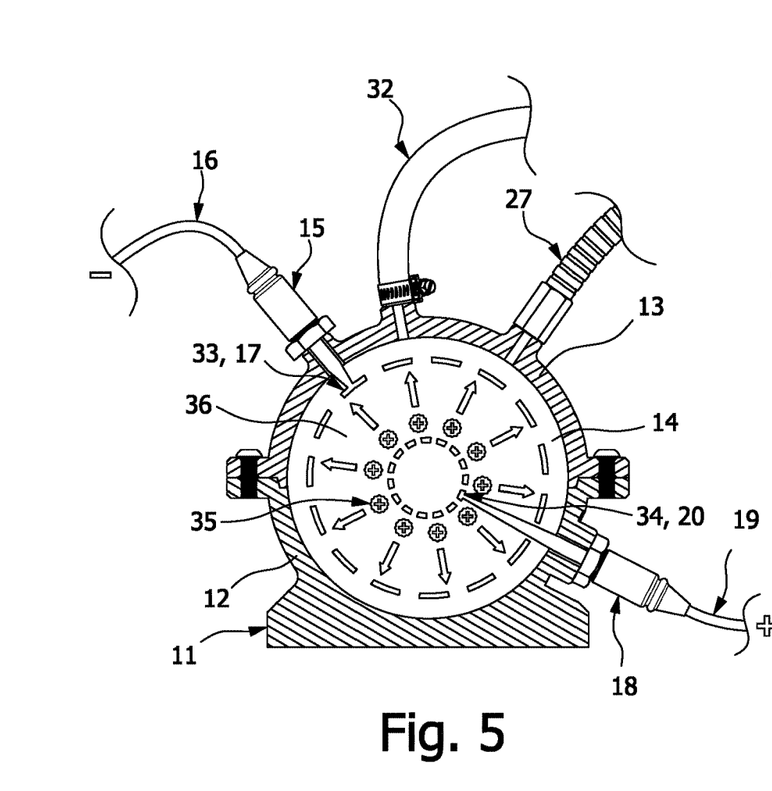
FIG. 5 is a view of FIG. 4 with the addition of representative symbols portraying one condition of positive and negative polarity of the current embodiment of electrodes of FIG. 2 and their effect on the positive ions of fusion fuel and said ions' component of travel between said electrodes.

FIG. 5 illustrates the same simplified sectioned profile of FIG. 4 with the addition of representative symbols to define the polarity of given components and to represent simply and broadly nuclear fusion fuel particles or particle clouds 35. With vacuum cavity 14 evacuated to sufficient pressure and with first electrode or plurality of electrodes 17 and second electrode or plurality of electrodes 20 electrically energy equally and oppositely in an alternating dynamic, nuclear fusion fuel 22 is introduced into said vacuum cavity from pressurized gas tank 23 in a metered quantity by means of pressure flow regulator 26 through pressurized gas supply line 27. The rate of flow is low enough that it does not interrupt the vacuum pressure of said vacuum cavity to any appreciable level nor does it quench the excited plasma field that forms said electrodes. Typical flow rate for example nuclear fusion fuel 22 deuterium is 1 to 1.5 milliliters per minute, though fusion still occurs at higher and lower flows rates than said range depending on vacuum pressure and electrical power supply voltage. As said fusion fuel enters the electric field between said electrodes, the fuel particles or particle clouds 35 become excited and form a plasma within electrode gap 36. As a plasma, the electrons of said particles have enough energy to escape their orbits, classically speaking, leaving ionized nuclei with a net positive charge behind. Said positively charged nuclei are ionized fuel particles or particle clouds 35 that are electromagnetlically attracted to the whichever of said electrodes has a net negative charge, also referred to as a temporary cathode. As said ions accelerate with a net direction of travel toward said temporary cathode, as FIG. 5 illustrates by means of symbolic arrows, they gain substantial momentum and because of the naturally chaotic distribution of particles within a given plasma cloud, the paths of a statistical percentage of said particles inevitably come close enough together that the attractive strong nuclear force overpowers the repulsive coulomb force and causes said nuclear particles to fuse. Fusion of such particles results in a new particle with a mass of less than the sum of the parent particles. The difference in mass is released as energy to be captured for practical use by various means.

Figure 6:
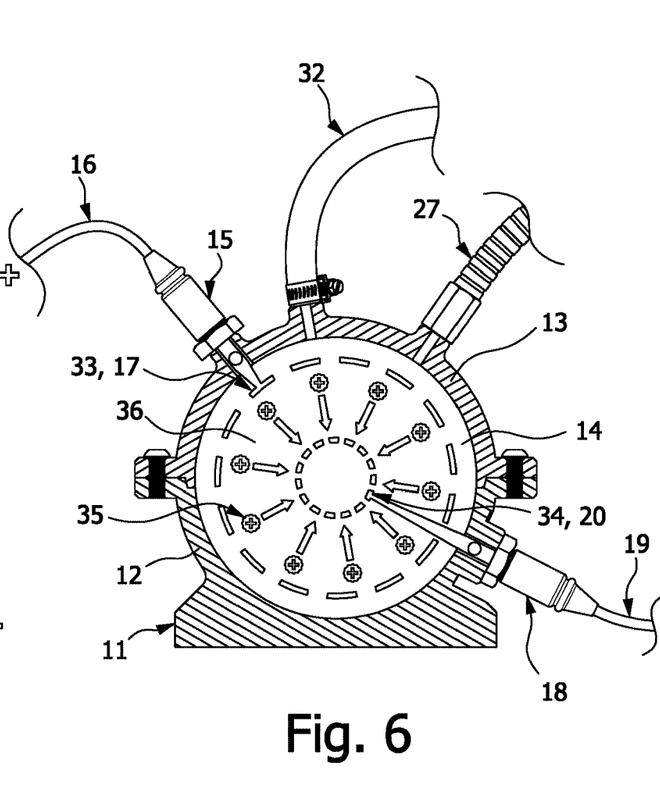
FIG. 6 is an identical view to FIG. 5, portraying the alternate condition of positive and negative polarity of the current embodiment of electrodes of FIG. 5 and their effect on the positive ions of fusion fuel and said ions' component of travel between said electrodes.

FIG. 6 illustrates the same elements, with the same view convention, as FIG. 5 with the exception of the exchanged polarities of first electrode or plurality of electrodes 17 and second electrode or plurality of electrodes 20. Illustrated by the symbolic arrows, the ionized fuel particles or particle clouds 35 of FIG. 5 have a reversed net direction of travel between said electrodes. Power supply 21 alternates the polarities of said electrodes with a sufficient frequency that ionized fuel particles or particle clouds 35 do not have enough time, given the velocity they achieve from the electric field between electrodes, to traverse electrode gap 36, thus eliminating or, for all practical purposes, substantially reducing the energy losses and particles losses of prior art and similarly eliminating or substantially reducing bombardment and consequent degradation of said electrodes and other internal components.

The mass of a given ionized fuel particle of nuclear fusion fuel 22 is fixed and known and its acceleration is determined by the magnitude of the voltage of the electric field between said electrodes through which said fuel particle travels. Its acceleration is used to calculate its speed which consequently determines the rate at which power supply 21 must alternate the polarity of said electrodes. For the example nuclear fusion fuel 22 deuterium gas, an ion consists of a single proton bound to a single neutron. The mass of said ionized particle is $3.34 \times 10^{-27}$ kilograms. The electric field between first electrode or plurality of electrodes 17 and second electrode or plurality of electrodes 20 is defined by the voltage divided by the distance; in the example case of said electrodes having an electrode gap 36 of 0.0254 meters and a supply voltage of 10,000 volts supplied by power supply 21, the electric field through which said particle travels is $10,000/0.0254 = 393,700.8$ volts/meter. Said ionized particle is acted upon by a force from said electric field that is defined by the electric field strength times the electrical charge of said particle. Said particle of example deuterium gas has a defined charge of $1.60 \times 10^{-19}$ coulombs. The force acting upon said ionized particle is therefore determined to be $393,700.8 * 1.60 \times 10^{-19} = 6.3 \times 10^{-14}$ Newtons. The acceleration is then determined by the equation acceleration=force/mass. The acceleration of said example particle is determined to be $6.3 \times 10^{-14}/3.34 \times 10^{-27} = 1.88 \times 10^{13}$ meters/second$^2$. The acceleration is used to determine the final velocity of the particle over electrode gap 36 using the formula $V_f 32 \sqrt{(V_i + 2ad)}$. Using an initial velocity of zero, the final velocity of an said example particle is calculated to be $\sqrt{(0 + 2 * 1.88 \times 10^{13} * 0.0254)} = 9.78 \times 10^5$ meters/second. To prevent the collision of particles at such a velocity with said electrodes, the time taken for said particle to traverse electrode gap 36 must be greater than the time taken to alternate the polarities of said electrodes. The time taken to traverse said gap is defined by (final velocity–initial velocity)*acceleration. For the example given the time is determined to be $(9.78 \times 10^5 - 0)/1.88 \times 10^{13} = 5.19 \times 10^{-8}$ seconds. Said power supply must therefore alternate the polarities of said electrodes at a rate faster than said time. Translated to the units of frequency, said power supply must alternate polarity faster than 1.93 megahertz for the given fuel type and example electrode geometry.

While the example provided is accurate for the assembly as described, voltage, current, and frequency of power supply 21 and vacuum pressure of vacuum cavity 14 are highly dependent upon the type and quantity of nuclear fusion fuel 22 used and the minimum electrode gap 36 between first electrode or plurality of electrodes 17 and second electrode or plurality of electrodes 20 in the present invention, which may vary from embodiment to embodiment depending upon application.

Figure 7:
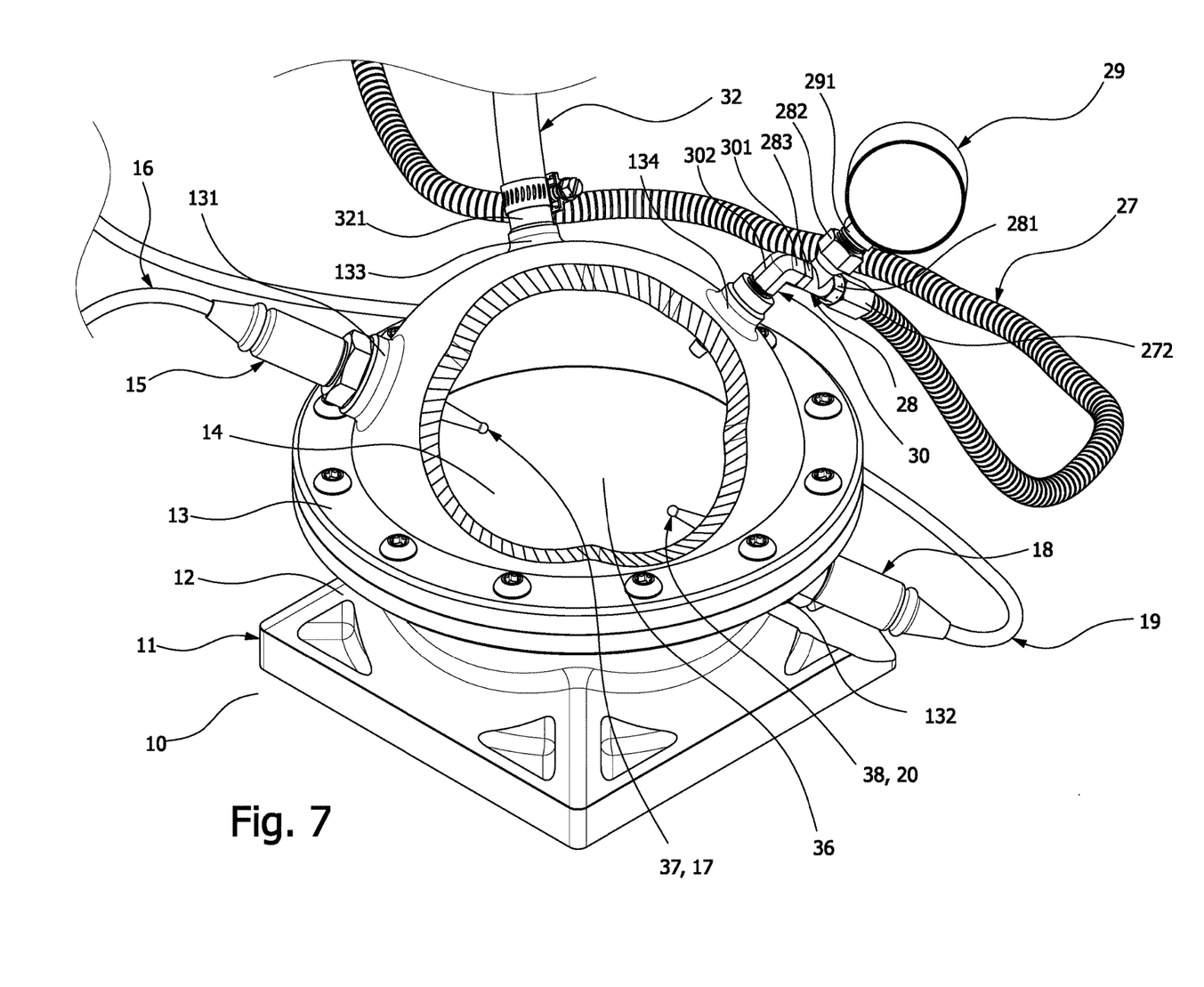
FIG. 7 is a front isometric sectional view of the current embodiment of the vacuum chamber containing an alternate example configuration of electrodes comprised of two generally conical electrodes with generally spherical tips constructed in accordance with the principles of the present invention and suitable for use with the inertial electrostatic confinement fusion device of FIG. 1.

FIG. 7 illustrates the same components and view as FIG. 2, with an alternate example of a preferred embodiment of first electrode or plurality of electrodes 17 and second electrode or plurality of electrodes 20. In the embodiment of said electrodes shown in FIG. 7, said electrodes are comprised each of a broadly spherical tip, supported by a conical base. First spherical conductive tip 37 is positioned substantially opposite the center of vacuum cavity 14 to second spherical conductive tip 38. As compared to the embodiment of electrodes in FIG. 2, the electrodes illustrated in FIG. 7 are of a simpler design in terms of manufacturability and are broadly equally symmetric in terms of the distribution of electric field lines about said electrodes. Another advantage of said layout is that the electric field lines naturally become denser closer to the surface of a given electrode which causes the density of ions of nuclear fusion fuel 22 to increase as the ions approach the electrode surface. The ions slow down as they approach a given electrode's surface due to the intentional alternating of polarity of the electrodes. As the ions slow down, their probability of collision and resulting fusion with another ion decreases. The increase of ion density that occurs simultaneous to the decrease in ion speed is advantageous because the increased density increases collision probability, therefore helping to offset the decrease of probability due to reduction in speed.

Figure 8:
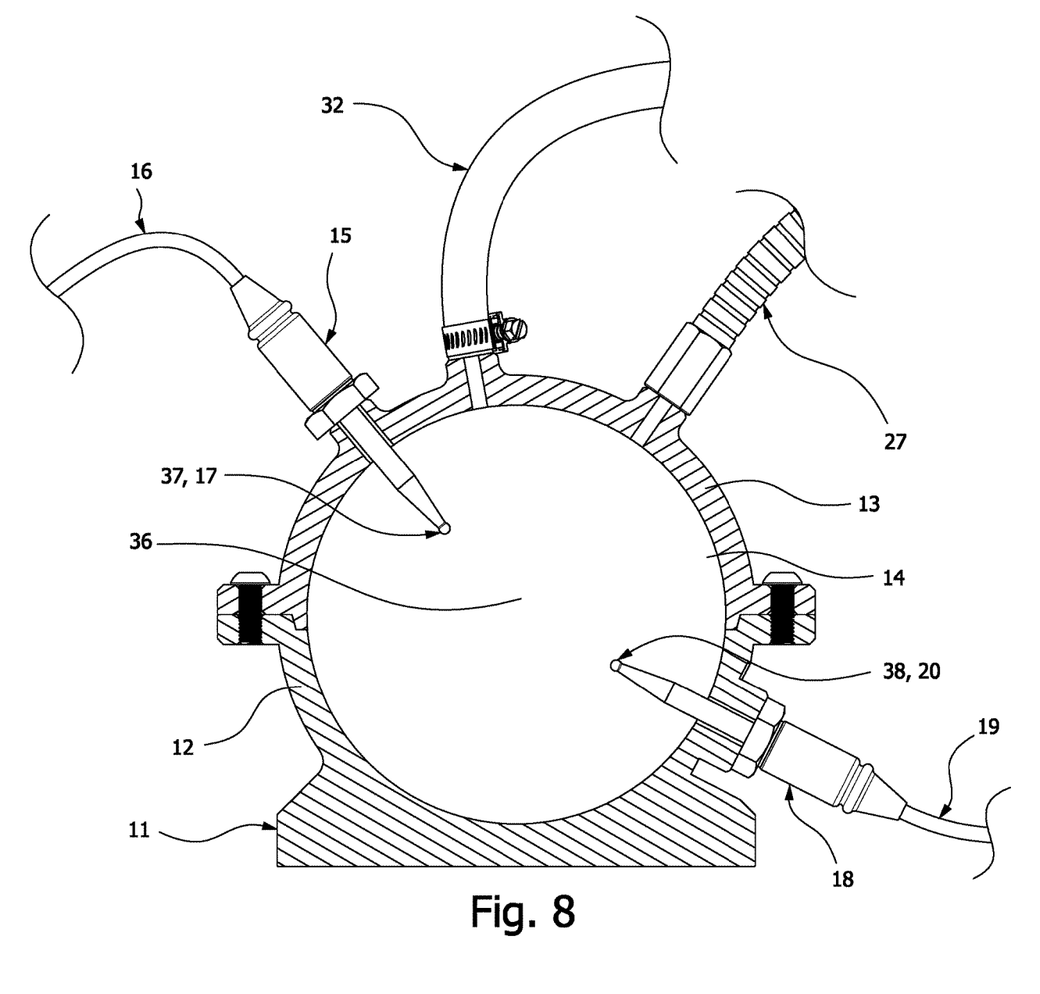
FIG. 8 is a front sectional simplified view of the current embodiment of the chamber and electrodes of FIG. 6 and the vacuum hose and fuel hose of FIG. 1.

FIG. 8 illustrates a sectioned profile of the vacuum chamber assembly 11 of FIG. 2, pressurized gas supply line 27 and vacuum hose 32 of FIG. 1, and first spherical conductive tip 37 and second spherical conductive tip 38 composing an example of a preferred embodiment of first electrode or plurality of electrodes 17 and second electrode or plurality of electrodes 20, respectively, the drawing simplified to a two-dimensional representation for convenient fitment of included componentry and ease of understanding. FIG. 8 is given to show, relative to FIG. 2, the shape and position of said electrodes.

Figure 9:
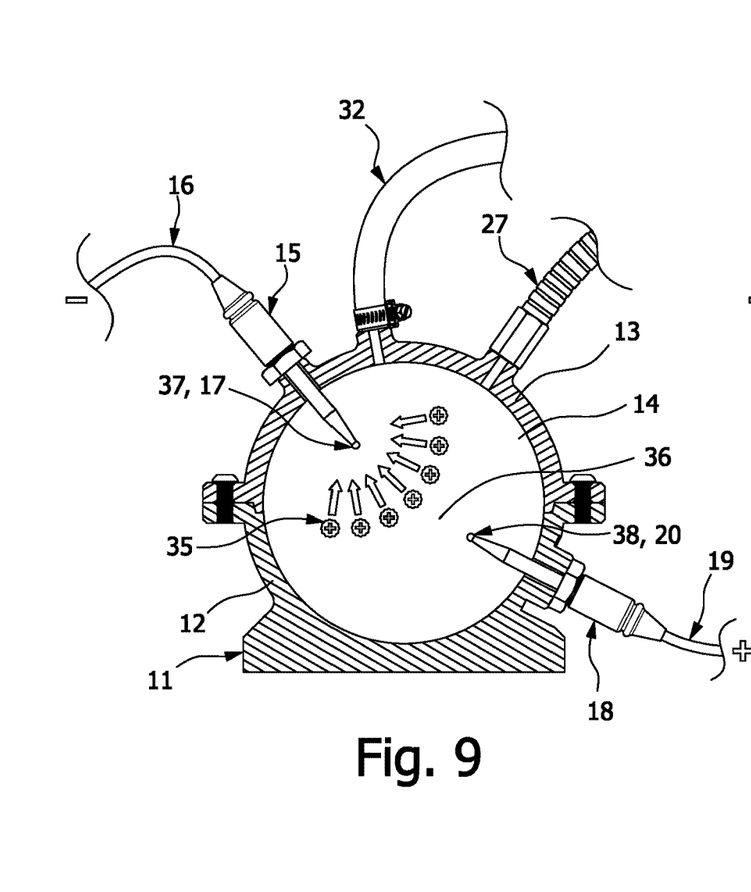
FIG. 9 is a view of FIG. 8 with the addition of representative symbols portraying one condition of positive and negative polarity of the current embodiment of electrodes of FIG. 2 and their effect on the positive ions of fusion fuel and said ions' component of travel between said electrodes.
Figure 10:
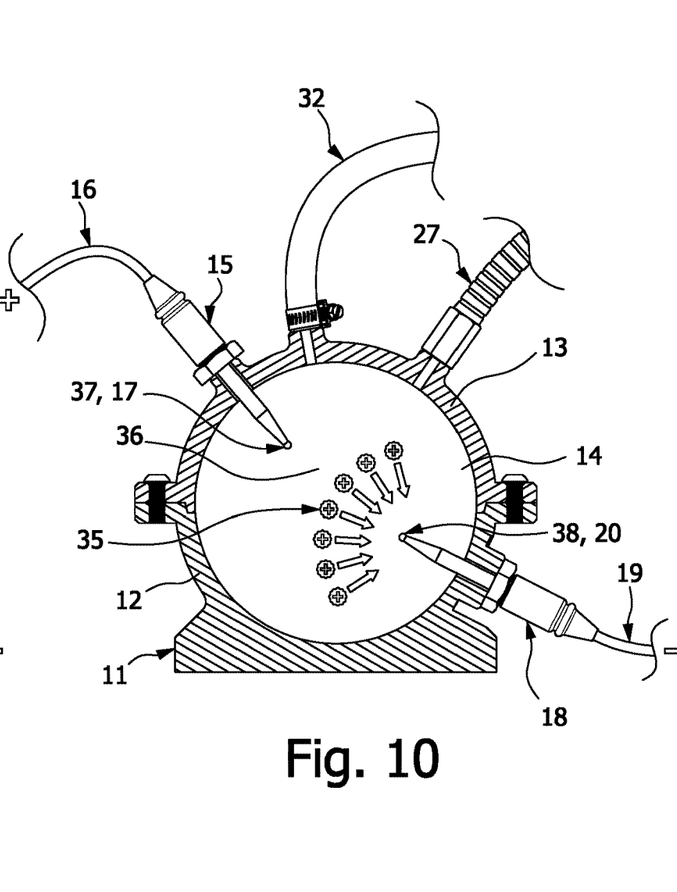
FIG. 10 is an identical view to FIG. 9, portraying the alternate condition of positive and negative polarity of the current embodiment of electrodes of FIG. 9 and their effect on the positive ions of fusion fuel and said ions' component of travel between said electrodes.

FIGS. 9 and 10 illustrate the same components, view, and additional representative symbols of FIGS. 5 and 6 with first electrode or plurality of electrodes 17 and second electrode or plurality of electrodes being comprised of first spherical conductive tip 37 and second spherical conductive tip 38, respectively, as an alternate example preferred embodiment to the example embodiment shown in FIGS. 2, 3, 4, 5, and 6. FIG. 9 illustrates specifically the case in which first electrode or plurality of electrodes 17 is electrically charged with negative polarity. Fuel particles or particle clouds 35 are therefore electromagnetically attracted to said electrode as is represented by symbolic arrows. As they approach said electrode, their density increases as the space between said particles decreases. FIG. 10 illustrates the case in which the polarity of said electrodes has been alternated and said particles therefore are attracted to the opposite electrode than what is illustrated in FIG. 9. As said particles follow the electric field lines between said electrodes, they spread apart and therefor decrease in density at thee point most equally distanced between said electrodes and begin to condense as they approach the electrode to which they are currently being attracted.

Figure 11:
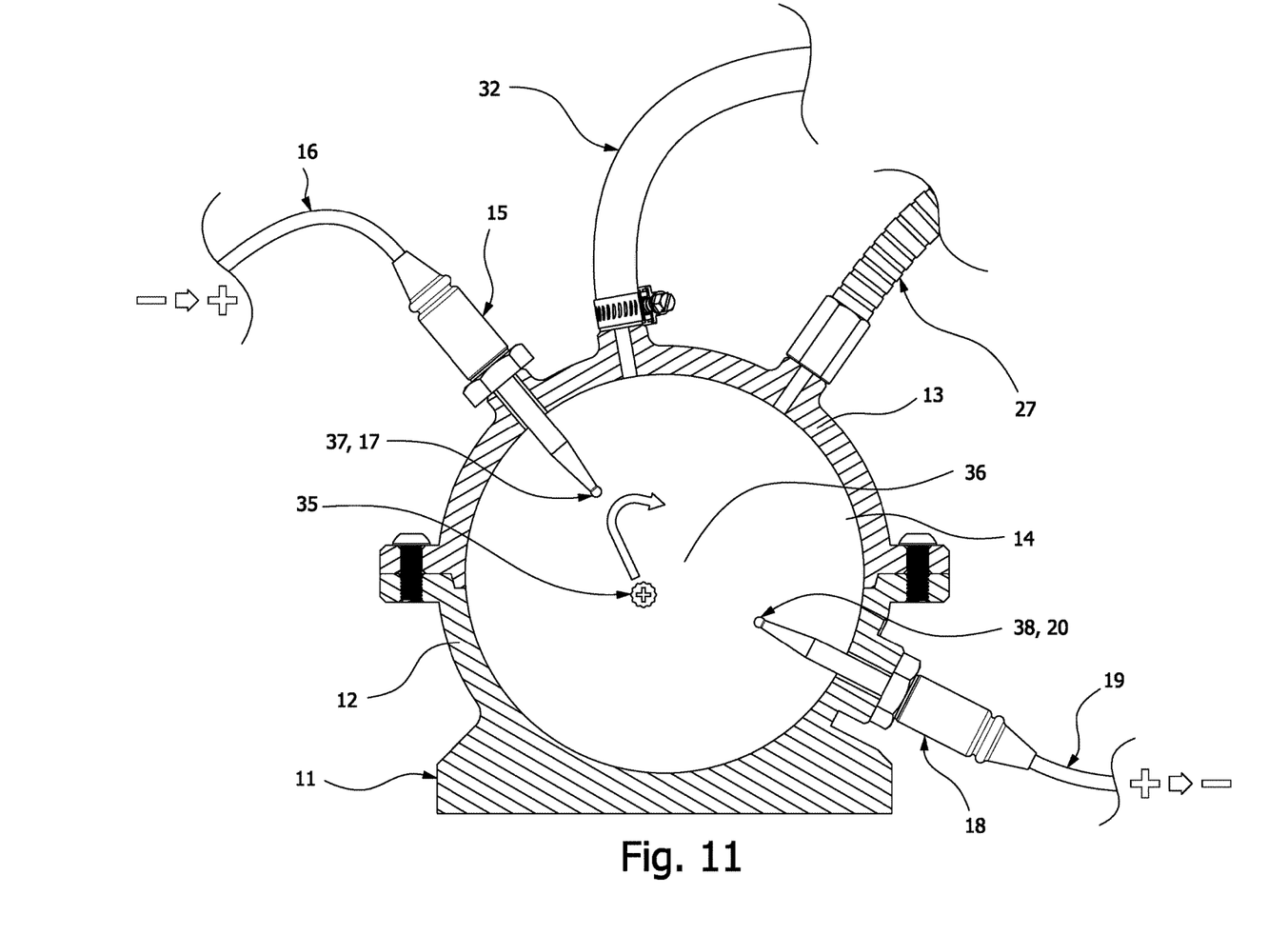
FIG. 11 is a view of FIG. 8 with the addition of representative symbols portraying an ionized nuclear fuel particle changing direction of travel, avoiding collision with an electrode, as the electrodes' polarities transition between negative and positive.

FIG. 11 illustrates the same components, view, and representative symbols of FIGS. 9 and 10 with the symbolic arrow, representative of the path of travel of fuel particles or particle clouds 35, shown as changing direction before said particles contact the electrode to which they are currently being attracted, thereby preventing the bombardment of particles into said electrode, improving substantially and materially the efficiency of inertial electrostatic confinement fusion device over prior art.

While only two specifically detailed examples of current embodiments of an inertial electrostatic confinement fusion device described here in detail, it should be obvious that further examples of embodiments consistent with the spirit of the invention or variations of given embodiments are likely possible, all of which are intended fall within the scope thereof. Having described the invention and its concepts as fully and as accurately as is necessary to provide those skilled in the art to understand, the invention claimed is:

I claim:

1. An inertial electrostatic confinement fusion device comprising:
    a pressure chamber; and
    a fusion fuel source connected to the pressure chamber such that fuel can be introduced at metered flow rate into the pressure chamber; and
    a plurality of electrodes contained within the pressure chamber, the electrodes being separated by a distance of free space defining an electrode gap; and
    an alternating polarity high voltage power supply electrically connected to the electrodes such that at least two electrodes are electrically charged with equal magnitude and opposite polarity throughout the cycle of alternating polarity, the voltage and current of the power supply being of sufficient magnitude to excite the fusion fuel within the pressure chamber to a plasma, the frequency of polarity alternation of the power supply being of a rate fast enough to prevent the ions of fusion fuel from traversing the entirety of the shortest electrode gap between any oppositely charged electrodes.

2. An inertial electrostatic confinement fusion device comprising:
    a pressure chamber; and
    a fusion fuel source connected to the pressure chamber such that fuel can be introduced at metered flow rate into the pressure chamber; and
    a plurality of electrodes contained within the pressure chamber, the electrodes being separated by a distance of free space defining an electrode gap; and
    an alternating polarity high voltage power supply electrically connected to the electrodes such that at least two electrodes are electrically charged with equal magnitude and opposite polarity throughout the cycle of alternating polarity, the voltage and current of the power supply being of sufficient magnitude to excite the fusion fuel within the pressure chamber to a plasma, the frequency of polarity alternation of the power supply being of a rate fast enough to confine the ions of fusion fuel that exist within the pressure chamber to a the vector of travel that is of a small enough magnitude to prevent the ions from colliding with any charged electrode.

3. An inertial electrostatic confinement fusion device comprising:
    a pressure chamber; and
    a fusion fuel source connected to the pressure chamber such that fuel can be introduced at metered flow rate into the pressure chamber; and
    a plurality of electrodes contained within the pressure chamber, the electrodes being separated by a distance of free space defining an electrode gap; and an alternating polarity high voltage power supply electrically connected to the electrodes such that at least two electrodes are electrically charged with equal magnitude and opposite polarity throughout the cycle of alternating polarity, the voltage and current of the power supply being of sufficient magnitude to excite the fusion fuel within the pressure chamber to a plasma, the polarity alternation occurring such that the ions of fusion fuel accelerate toward any electrodes of opposite polarity for long enough to gain sufficient velocity to facilitate nuclear fusion but not long enough to collide with said electrodes before the reversal of electrode polarity.

* * * * *